United States Patent
Nicolaos et al.

(10) Patent No.: US 8,066,869 B2
(45) Date of Patent: Nov. 29, 2011

(54) PROCESS FOR DEEP DESULPHURIZATION OF CRACKING GASOLINES WITH A SMALL LOSS OF OCTANE NUMBER

(75) Inventors: Alexandre Nicolaos, Lyons (FR); Florent Picard, Communay (FR); Quentin Debuisschert, Rueil-Malmaison (FR); Annick Pucci, Croissy-sur-Seine (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 298 days.

(21) Appl. No.: 11/984,329

(22) Filed: Nov. 15, 2007

(65) Prior Publication Data
US 2008/0128328 A1 Jun. 5, 2008

(30) Foreign Application Priority Data
Nov. 16, 2006 (FR) .................... 06 10111

(51) Int. Cl. *C10G 67/06* (2006.01)
(52) U.S. Cl. .................... 208/212; 208/213; 208/244
(58) Field of Classification Search .......... 208/209, 208/210, 211, 212, 216 R, 216 PP, 217, 218, 208/244
See application file for complete search history.

(56) References Cited

U.S. PATENT DOCUMENTS

| | | | |
|---|---|---|---|
| 4,990,242 A * | 2/1991 | Louie et al. | 208/218 |
| 5,106,484 A | 4/1992 | Nadler | |
| 5,322,615 A * | 6/1994 | Holtermann et al. | 208/91 |
| 5,597,476 A * | 1/1997 | Hearn et al. | 208/208 R |
| 6,013,598 A * | 1/2000 | Lapinski et al. | 502/305 |
| 6,228,254 B1 | 5/2001 | Jossens | |
| 6,231,753 B1 * | 5/2001 | McKnight et al. | 208/217 |
| 6,579,444 B2 * | 6/2003 | Feimer et al. | 208/243 |
| 6,596,157 B2 * | 7/2003 | Gupta et al. | 208/210 |
| 2004/0044262 A1 | 3/2004 | Yang | |
| 2005/0252831 A1 | 11/2005 | Dysard | |

FOREIGN PATENT DOCUMENTS

| | | |
|---|---|---|
| GB | 1 098 698 A | 1/1968 |
| WO | WO 93/12204 A | 6/1993 |
| WO | WO 02/053684 A | 7/2002 |

* cited by examiner

*Primary Examiner* — Walter Griffin
*Assistant Examiner* — Renee E Robinson
(74) *Attorney, Agent, or Firm* — Millen, White, Zelano & Branigan, P.C.

(57) ABSTRACT

The invention relates to a treatment process of a sulphur-containing hydrocarbon fraction, comprising the following steps:

a) a hydrodesulphurization step of said hydrocarbon fraction to produce a sulphur-depleted effluent, consisting of passing the hydrocarbon fraction mixed with hydrogen over at least one hydrodesulphurization catalyst.

b) a step of separation of the partially desulphurized hydrocarbon fraction from the hydrogen introduced in excess, as well as the $H_2S$ formed in step a).

c) a step of collecting both mercaptans and thiophenic compounds, consisting of placing the partially desulphurized hydrocarbon fraction originating in step b) in contact with an adsorbent comprising at least one element chosen from the group constituted by the elements of groups VIII, IB, IIB and IVA, the adsorbent being used in reduced form in the absence of hydrogen at a temperature above 40° C., the metal content in the reduced form of the adsorbent being above 25% by weight.

24 Claims, No Drawings

PROCESS FOR DEEP DESULPHURIZATION OF CRACKING GASOLINES WITH A SMALL LOSS OF OCTANE NUMBER

The present invention relates to a process allowing sulphur contents to be reduced generally in hydrocarbons and more particularly in gasolines and preferably, in cracking gasolines, while preserving a high octane number and minimizing hydrogen consumption.

The specifications for motor vehicle fuels provide for a considerable reduction in the sulphur content of these fuels, and in particular gasolines. This reduction is intended to limit in particular the sulphur and nitrogen oxides contents of the exhaust gases of motor vehicles. European legislation defines gasoline fuel specifications which have been 50 ppm sulphur since 2005 and will be reduced to 10 ppm sulphur in 2009. To achieve these specifications, it is necessary to treat gasolines in order to reduce their sulphur content.

The principal sources of sulphur in gasoline bases are so-called cracking gasolines and principally, the gasoline fraction originating in a process of catalytic cracking of a residue of the atmospheric or vacuum distillation of a crude oil. The gasoline faction originating in catalytic cracking, which on average accounts for 40% of gasoline bases, in fact accounts for over 90% of the sulphur in gasolines. Therefore production of low-sulphur gasolines requires a step of desulphurization of catalytic cracking gasolines. Among other sulphur-rich sources of gasoline, coker and visbreaker gasolines can also be mentioned, or to a lesser extent, gasolines from atmospheric distillation or steam cracking gasolines.

The sulphur content of gasolines can be reduced by supplying the refinery with low-sulphur crude oils, but the increasing scarcity of crude oil is causing refiners to purchase high-sulphur crudes. Among the possible alternative routes for producing low-sulphur fuels, the one which has been very widely adopted consists of particularly treating high-sulphur gasoline bases by hydrodesulphurization processes in the presence of hydrogen. Conventional processes desulphurize the gasolines in a non-selective manner, hydrogenating a large part of the monoolefins, which results in a substantial loss in octane number and a high hydrogen consumption. The most recent processes, such as the Prime G+ (trademark) process, allow olefin-rich cracking gasolines to be desulphurized, while still limiting hydrogenation of the monoolefins and thus the resulting octane loss and high hydrogen consumption. Such processes are for example described in patent applications EP-A-1077247 and EP-A-1174485. Nevertheless, in the case where cracking gasolines must be desulphurized very deeply, some of the olefins present in the cracking gasolines are hydrogenated on the one hand, and recombine with the $H_2S$ to form mercaptans on the other hand.

Hydrodesulphurization of cracking gasolines which contain monoolefins consists of passing the charge to be treated, mixed with hydrogen, over a metal sulphide-type catalyst, in order to promote reactions that reduce sulphur to hydrogen sulphide ($H_2S$). The reaction mixture is then cooled to condense the gasoline. The gaseous phase containing the excess hydrogen and the $H_2S$ is separated and the desulphurized gasoline is recovered.

Residual sulphurous compounds generally present in desulphurized gasoline can be separated into two separate families: non-hydrogenated sulphurous compounds present in the charge on the one hand, and sulphurous compounds formed in the reactor by secondary reactions called recombination reactions. Among this latter family of sulphurous compounds, the majority of the compounds are mercaptans from the addition of the $H_2S$ formed in the reactor to the monoolefins present in the charge. The mercaptans of chemical formula R—SH where R is an alkyl group; are also called recombinant mercaptans and generally account for between 20% by weight and 80% by weight of the residual sulphur in desulphurized gasolines.

The recombinant mercaptans content can be reduced by catalytic hydrodesulphurization, but this involves hydrogenation of a large part of the monoolefins present in the gasoline, which then means a marked reduction in the octane number of the gasoline, as well as an extra consumption of hydrogen. It is also known that the lower the sulphur content, the greater is the octane loss associated with hydrogenation of the monoolefins during the hydrodesulphurization step; i.e. it is sought to remove in depth the sulphur compounds present in the charge.

For these reasons, it is thus preferable to treat this partially hydrodesulphurized gasoline by a judiciously chosen adsorption technique which will allow the sulphur compounds initially present in the cracking gasolines and not converted and the recombinant mercaptans to be eliminated at the same time, without hydrogenating the monoolefins present, in order to preserve the octane number.

Various solutions are described in the literature for desulphurizing cracking gasolines using processes of the adsorption type or by a combination of hydrodesulphurization or adsorption steps.

For example, patent application US20030188992 describes how to desulphurize olefinic gasolines by treating the gasoline in a first hydrodesulphurization step, then by eliminating the mercaptan-type compounds from them during a finishing step. This finishing step consists principally of an extraction of the mercaptans by washing with a solvent.

U.S. Pat. No. 5,866,749 proposes a solution for collecting the elementary sulphur and the mercaptans contained in an olefinic cut by passing the mixture to be treated over a reduced metal chosen from groups IB, IIB, IIIA of the periodic table and carried out at a temperature of below 37° C.

U.S. Pat. No. 6,579,444 presents a process intended to collect the sulphur present in gasolines or the residual sulphur present in partially desulphurized gasolines, based on the use of a solid containing cobalt as well as a metal of group VI.

Patent application US2003/0226786 presents a process for desulphurization of gasoline by adsorption as well as methods for regenerating the adsorbent. The considered adsorbent is any hydrotreatment catalyst and more particularly solids containing a metal of group VIII alone or in a mixture with a metal of group VI and containing between 2% and 20% metal from group VIII.

SUMMARY OF THE INVENTION

The invention relates to a process for treatment of a sulphur-containing hydrocarbon fraction, comprising the following steps:

a) a hydrodesulphurization step of said hydrocarbon fraction in order to produce a sulphur-depleted effluent, consisting of passing said hydrocarbon fraction mixed with hydrogen over at least one hydrodesulphurization catalyst.

b) a step of separation of the partially desulphurized hydrocarbon fraction from the hydrogen introduced in excess, as well as the $H_2S$ formed in step a).

c) a step of collection of the sulphurous compounds, consisting of placing the partially desulphurized hydrocarbon fraction originating in step b) in contact with an adsorbent comprising at least one element chosen from the group constituted by the elements of groups VIII, IB, IIB and IVA (groups VIII, IB, IIB and IVA according to the CAS classification correspond respectively to the metals of groups 8 to 10 for group VIII, metals of group 11 for group IB, metals of group 12 for group IIB and metals of group 14 for group IVA of the new IUPAC classification according to the CRC Handbook of Chemistry and Physics, published by CRC Press, editor in chief D. R. Lide, 81$^{st}$ edition, 2000-2001), the adsorbent being used in reduced form in the absence of hydrogen at a temperature above 40° C., the reduced-form metal content of the adsorbent being above 20% by weight.

Due to the step of collection downstream of the hydrodesulphurization step, the operating conditions of the hydrodesulphurization are much less severe (for example, considerable reduction in the operating temperature and/or pressure) which leads to an improvement in the life of the catalyst of the hydrodesulphurization step as well as the energy consumption.

DETAILED DESCRIPTION OF THE INVENTION

It was discovered that it is possible to use a metal or a combination of metals belonging to groups VIII, IB, IIB or IVA of the periodic table of the elements, in particular conditions to in order to collect by adsorption the various residual sulphurous compounds originating in a first hydrodesulphurization step. These metals are deposited on a support and reduced before use. They can then trap by chemisorption sulphurous compounds such as mercaptans and simultaneously, non-converted compounds such as thiophenes, on condition that a sufficiently high temperature is used, at least above 40° C., preferably above 50° C., more preferably above 75° C. and most preferably above 100° C. Once the adsorbent is saturated with sulphur, it can be replaced by a new reduced adsorbent. The sulphur adsorption device thus generally comprises one or more reactors in order to allow continuous operation.

The present invention thus proposes a process for deep desulphurization of a hydrocarbon cut, preferably a gasoline, and is particularly suitable for the treatment of cracking gasolines containing olefins. The invention consists of the linking of at least a catalytic hydrodesulphurization followed by at least a step of desulphurization by adsorption intended to simultaneously collect the recombinant mercaptans and the non-converted sulphurous compounds in order to limit the octane loss of the gasoline to be treated.

Description of the Charge:

The hydrocarbon fraction containing treated sulphur is preferably a gasoline containing olefinic compounds.

The hydrocarbon cut to be treated can be a gasoline cut and more particularly a gasoline cut originating in a catalytic cracking process. Any gasoline originating in any cracking process can be used as a charge. These gasolines contain olefinic compounds and it is necessary to desulphurize these gasolines while still preserving their octane number.

The treated hydrocarbon fraction generally has a boiling point below 350° C., preferably below 300° C. and more preferably below 250° C.

Description of the Catalytic Hydrodesulphurization Step (Step a)

The hydrodesulphurization step is used to reduce the sulphur content of the hydrocarbon fraction to be treated. Its use is particularly necessary when the charge to be desulphurized contains more than 100 ppm by weight of sulphur and more generally more than 50 ppm by weight of sulphur.

The hydrodesulphurization step consists of putting the gasoline to be treated in contact with the hydrogen, in one or more hydrodesulphurization reactors in sequence, containing one or more catalysts suitable for carrying out the hydrodesulphurization.

According to a preferred embodiment of the invention, step a) will be used to carry out a hydrodesulphurization in a selective way, i.e. with a monoolefin hydrogenation level below 80%, preferably below 70% and even more preferably below 60%.

The operating pressure of this step is generally comprised between 0.5 MPa and 5 MPa and preferably between 1 MPa and 3 MPa. The temperature is generally comprised between 200° C. and 400° C. and preferably between 220° C. and 380° C. In the case where the hydrodesulphurization step a) is carried out in several reactors in sequence, the average operating temperature of each reactor is generally higher by at least 5° C., preferably at least 10° C. and most preferably at least 15° C. than the operating temperature of the preceding reactor.

The quantity of catalyst used in each reactor is generally such that the ratio between the flow-rate of gasoline to be treated expressed in m$^3$ per hour under standard conditions to m$^3$ of catalyst (also called space velocity), is comprised between 0.5 h$^{-1}$ and 20 h$^{-1}$ and preferably between 1 h$^{-1}$ and 15 h$^{-1}$. Most preferably, the first reactor will be operated at a space velocity comprised between 2 h$^{-1}$ and 8 h$^{-1}$.

The hydrogen flow-rate is generally such that the ratio between the hydrogen flow-rate expressed in m$^3$ per hour (Nm$^3$/h) under standard conditions and the charge flow-rate to be treated expressed in m$^3$ per hour under standard conditions is comprised between 50 Nm$^3$/m$^3$ and 1000 Nm$^3$/m$^3$, preferably between 70 Nm$^3$/m$^3$ and 800 Nm$^3$/m$^3$.

The rate of desulphurization achieved during this hydrodesulphurization step is generally above 50% and preferably above 70%. The rate of desulphurization depends on the sulphur content of the charge to be treated, but it is such that the product originating in step a) contains less than 100 ppm by weight of sulphur and preferably less than 50 ppm sulphur.

Any catalyst known to a person skilled in the art to for promoting reactions transforming organic sulphur into H$_2$S in the presence of hydrogen can be used within the framework of the invention. However, according to a particular embodiment of the invention, the use of catalysts having a good selectivity vis-à-vis hydrodesulphurization reactions is preferred. By way of example, it is possible to use catalysts comprising an amorphous and porous mineral support chosen from the group constituted by aluminas, silicon carbide, silica, titanium oxide, magnesium oxide, these two last oxides being used alone or mixed with alumina or silica-alumina. It is preferably chosen from the group constituted by silica, the family of the transition aluminas and the silica-aluminas. Most preferably, the support is substantially constituted by at least one transition alumina, that is to say that it comprises at least 51% by weight, preferably at least 60% by weight, most preferably at least 80% by weight, even at least 90% by weight transition alumina. It can optionally be constituted by a transition alumina only. The specific surface area of the support is generally less than 200 m$^2$/g and preferably less than 150 m$^2$/g. The porosity of the catalyst before sulphuration is generally such that the latter has an average pore diameter greater than 20 nm, preferably greater than 25 nm or even 30 nm and frequently comprised between 20 and 140 nm, preferably between 20 and 100 nm, and most preferably between 25 and 80 nm. The pore diameter is measured by mercury porosimetry according to standard ASTM D4284-92, with a wetting angle of 140°.

The hydrodesulphurization catalyst generally contains at least one metal of group VIB and/or at least one metal of group VIII on a support (groups VIB and VIII according to the CAS classification correspond respectively to the metals of group 6 and groups 8 to 10 of the new IUPAC classification according to the CRC Handbook of Chemistry and Physics, published by CRC Press, editor in chief D. R. Lide, 81$^{st}$ Edition, 2000-2001). The metal from group VIB is generally molybdenum or tungsten, the metal from group VIII is generally nickel or cobalt. The surface density of the metal from group VIB is generally comprised according to the invention between $2 \times 10^{-4}$ and $4.0 \times 10^{-3}$ grams of oxide of said metal per m$^2$ of support, preferably between $4 \times 10^{-4}$ and $1.6 \times 10^{-3}$ grams of oxide of said metal per m$^2$ of support.

Most preferably, a catalyst or sequence of catalysts will be used, such as those described in patent application US20060000751A1. These are catalysts comprising a support, for example chosen from refractory oxides such as aluminas, silicas, silica-aluminas or magnesium oxide, used alone or in a mixture with each other, a metal of group VIB, preferably molybdenum or tungsten, promoted or not by a metal of group VIII, preferably cobalt or nickel. These catalysts have an average pore diameter greater than 22 nm. In the possible case of a sequence of catalysts, the process comprises a succession of hydrodesulphurization steps, such that the catalyst activity of one step n+1 is comprised between 1% and 90% of the activity of the catalyst of step n.

Step of Separation of the Hydrogen and the H$_2$S (Step b)

This step is carried out in order to separate the excess of hydrogen as well as the H$_2$S of the hydrocarbon fraction.

By way of illustration, step b) is preferably carried out as follows. After the hydrodesulphurization step a), the reaction mixture is cooled to a temperature generally below 80° C. and preferably below 60° C. in order to condense the hydrocarbons. The gas and liquid phases are separated in a separation flask. The liquid fraction containing the desulphurized gasoline as well as a fraction of dissolved H$_2$S is sent to a stripping section, the gaseous fraction constituted principally by hydrogen and which contains the majority of the H$_2$S is sent to a purification section. The stripping can be carried out by heating the hydrocarbon fraction in a distillation column in order to extract overhead, the light compounds entrained by dissolution in the liquid fraction as well as the dissolved residual H$_2$S. The temperature of the stripped gasoline recovered at the foot of the column is generally comprised between 120° C. and 250° C.

Step b) is preferably carried out in order that the sulphur in the form of H$_2$S remaining in the gasoline, before the adsorption step c), accounts for at least 30% or even 20% or even 10% of the total sulphur present in the treated hydrocarbon fraction.

Step of Desulphurization by Adsorption (Step c)

The gasoline obtained after catalytic hydrodesulphurization (step a) and after separation of gases such as hydrogen and H$_2$S (step b) is sent to an adsorption step (step c). This adsorption step is carried out by placing the produced hydrocarbon with an adsorbent solid having a strong affinity both for non-converted sulphurous compounds such as the thiophene compounds already present in the cracking gasoline to be desulphurized and for the recombinant mercaptans produced during the catalytic hydrodesulphurization step.

The adsorbent comprises at least one element chosen from the group constituted by the elements of groups VIII, IB, IIB and IVA, preferably at least one element chosen from the group constituted by nickel or iron for group VIII, copper for group IB, zinc for group IIB and lead for group IVA, and most preferably the adsorbent contains at least nickel. The adsorbent is used in reduced form.

The reduced-form metal content of the adsorbent is preferably above 25% by weight, and most preferably above 40% by weight. The reduced-form metal content of the adsorbent is calculated as follows:

reduced-metal content=[(composition of the metal in reduced form)/(composition of the adsorbent)]* 100.

The adsorbent can comprise a support based on a metal oxide or a binder based on a metal oxide, the metal oxide being chosen from the group constituted by the following families: silicas, aluminas, silica-aluminas as well as zeolites. Preferably, an alumina is chosen. The BET surface of said alumina is generally as great as possible in order to encourage the contact between the charge and the solid. The BET surface of the support is preferably greater than 100 m$^2$/g, more preferably greater than 125 m$^2$/g and most preferably greater than 150 m$^2$/g.

Desulphurization by adsorption involves the chemisorption of the sulphurous molecules on the support, and this phenomenon requires activation energy to be contributed. Therefore the operating temperature is generally above 40° C., preferably above 50° C., more preferably above 75° C. and most preferably above 100° C. The charge must preferably remain liquid, which requires a sufficient pressure, greater than the vaporization pressure of the charge.

The adsorbent is generally used in the absence of hydrogen at a temperature above 40° C., or also comprised between 40° C. and 300° C., preferably between 100° C. and 250° C., more preferably between 130° C. and 240° C. and even more preferably between 140° C. and 240° C.

The hourly space velocity (HSV) is defined as the incoming rate of flow of the charge per volume of adsorbent used and is preferably comprised between 0.1 h$^{-1}$ and 20 h$^{-1}$, more preferably between 0.5 h$^{-1}$ and 15 h$^{-1}$ and most preferably between 0.5$^{-1}$ and 10 h$^{-1}$.

Before using the solid, it is necessary to reduce the metal contained in the collection composition. Several solutions can be envisaged to carry out this reduction step. The metal can be reduced by impregnation of an oxygenated organic compound such as a ketone, an aldehyde, an alcohol, a carboxylic acid, which following a thermal treatment will act as a reducing agent (see patent application FR2642670). This method of reduction can also be used in the presence of a halogenated additive (see patent application FR2680703). The metal can also be reduced under a hydrogen flux, in order to form reduced metal. The final reduction temperature will have to be above 150° C., preferably above 250° C. and more preferably above 400° C. Most preferably, the aim is a reduction above 30%, or even above 40% or even above 50% of the metal dispersed on the surface of the crystallites.

Moreover, it is known that reduced metals tend to warm up when they are handled in air, due to their reactivity vis-à-vis oxygen. It can therefore be advantageous, while still remaining within the scope of the invention, to use reduction compositions which have undergone a surface passivation step. By a surface passivation step is meant a step of neutralization of the reactivity of the solid with the oxygen of the air, by a reversible treatment. The most widespread passivation methods consist of carrying out a partial and surface oxidization of the metal in air or alternatively to passivate the metal by adsorption of carbon dioxide, or else to coat the solid in a paraffin which constitutes a protective layer.

Schemes which can be Used within the Framework of the Invention.

While still remaining within the framework of the invention, various schemes can be used in order to produce a desulphurized gasoline at less cost. The choice of the optimum scheme depends on the characteristics of the gasolines to be treated and to be produced as well as the constraints peculiar to each refinery.

By way of a non-limitative example, the schemes below can be considered, while still remaining within the framework of the invention.

According to a first variant, collection step c) can be carried out directly in sequence with separation step b). In particular, where separation step b) is carried out at an operating temperature compatible with the operating temperature of collection step c), the effluent originating in step b) will be sent directly to step c). The use of heat exchangers to adjust the temperature between steps b) and c) can also be considered.

According to a second variant, consideration can also be given to mixing the gasoline originating in step b), before the sulphur-collection step c), with another gasoline containing sulphur, such as for example crude oil distillation gasolines, gasolines originating in any cracking process such as gasolines originating in pyrolysis, cokefaction or hydrocracker processes.

According to a third variant, it can be advantageous to distil the hydrocarbon fraction to be treated into several fractions and to treat each fraction separately. By way of example, it is possible, while still remaining within the framework of the invention, to distil the hydrocarbon fraction to be treated into two fractions, a light fraction and a heavy fraction, and to treat only the heavy fraction in the hydrodesulphurization step a), to remix the light and heavy fractions before or after the $H_2S$ separation step b), and to treat the light and heavy fractions jointly in the collection step c). This scheme has the advantage of not hydrotreating the light fraction which is rich in olefins but generally poor in sulphur, which overall, can allow the octane loss to be limited.

According to a fourth variant, it is possible to treat the sulphur-containing hydrocarbon fraction in a first step consisting of converting the mercaptan-type light saturated sulphurous compounds into heavier sulphurous compounds. This type of treatment can be carried out either by a method of oxidation of the mercaptans into disulphides that is known to a person skilled in the art, or by a method of treatment with hydrogen under mild conditions, as described in patent application EP-A-1077247. The hydrocarbon fraction thus produced can be distilled into at least two cuts, preferably three cuts; a light cut, an intermediate cut and a heavy cut. In the case of three cuts, each of the intermediate and heavy cuts is treated separately in a hydrosulphurization step (step a), then a separation step (step b), and the step of collecting the sulphurous compounds (step c) is used on the effluents of steps b) or on their mixture.

In conclusion, the invention relates to a treatment process of a sulphur-containing hydrocarbon fraction, comprising the following steps:

a) a hydrodesulphurization step of said hydrocarbon fraction to produce a sulphur-depleted effluent, consisting of passing said hydrocarbon fraction mixed with hydrogen over at least one hydrodesulphurization catalyst.

b) a step of separation of the partially desulphurized hydrocarbon fraction from the hydrogen introduced in excess, as well as the $H_2S$ formed in step a).

c) a step of collecting the sulphurous compounds, consisting of placing the partially desulphurized hydrocarbon fraction originating in step b) in contact with an adsorbent comprising at least one element chosen from the group constituted by the elements of groups VIII, IB, IIB and IVA, the adsorbent being used in reduced form in the absence of hydrogen at a temperature above 40° C., in the absence of hydrogen, preferably comprised between 40° C. and 300° C., the metal content in the reduced form of the adsorbent being above 25% by weight and preferably above 40% by weight.

According to a preferred embodiment, the hydrocarbon fraction is a gasoline containing olefinic compounds.

Preferably, the adsorbent comprises an element chosen from the group constituted by nickel or iron for group VIII, copper for group IB, zinc for group IIB and lead for group IVA and more preferably, the adsorbent comprises nickel.

Preferably, the adsorbent comprises a support based on a metal oxide or a binder based on a metal oxide, the metal oxide being chosen from the group constituted by the following families: silicas, aluminas, silica-aluminas, as well as zeolites.

Example 1

According to the Prior Art

A hydrodesulphurization catalyst α is obtained by impregnation "without excess solution" of a transition alumina in the form of beads having a specific surface area of 130 m²/g and a porous volume of 0.9 ml/g, by an aqueous solution containing molybdenum and cobalt in the form of ammonium heptamolybdate and cobalt nitrate. The catalyst is then dried and calcined in air at 500° C. The cobalt and molybdenum content of this sample is 3% by weight CoO and 10% by weight $MoO_3$.

100 ml of the catalyst A is placed in a fixed-bed tubular hydrodesulphurization reactor. First, the catalyst is sulphurated by treatment during 4 hours under a pressure of 3.4 MPa at 350° C., in contact with a charge constituted by 2% by weight of sulphur in the form of dimethyldisulphide in n-heptane.

The charge treated is a catalytic cracked gasoline of which the initial boiling point is 50° C. and the final boiling point 225° C. and of which the MON is 80.6 and the RON, 92.5. Its sulphur content is 1650 ppm by weight and its bromine number (IBr) is 69 g/100 g, which corresponds approximately to 36% by weight of olefins.

This charge is treated over the catalyst α, under a pressure of 1.5 MPa, a volume ratio of hydrogen to charge to be treated ($H_2$/HC) of 300 l/l and a VVH of 3 h$^{-1}$. After treatment, the gasoline-hydrogen mixture is cooled, the hydrogen rich in $H_2S$ is separated from the liquid gasoline, and the gasoline is subjected to a stripping treatment by injection of a hydrogen flux in order to collect the residual traces of $H_2S$ dissolved in the gasoline.

Table 1 shows the influence of the temperature on the rates of desulphurization and saturation of the olefins.

TABLE 1

| | References for the hydrodesulphurated gasoline | | | |
|---|---|---|---|---|
| | A1 | A2 | A3 | A4 |
| Temperature, ° C. | 290 | 300 | 310 | 320 |
| Mercaptans, ppm by weight | 31.2 | 24.7 | 18.1 | 10.2 |
| Total sulphur, ppm by weight | 55.6 | 30.0 | 19.8 | 10.8 |

TABLE 1-continued

| | References for the hydrodesulphurated gasoline | | | |
|---|---|---|---|---|
| | A1 | A2 | A3 | A4 |
| Desulphurization rate, % | 96.5% | 98.2% | 98.8% | 99.3% |
| Hydrogenation rate of the olefins, % | 30.8% | 38.2% | 46.5% | 55.6% |
| Delta MON | 1.3 | 1.5 | 1.9 | 2.2 |
| Delta RON | 3.7 | 4.7 | 5.5 | 7.2 |

The operating temperatures required to reach 10 ppm sulphur with this type of gasoline are high. In these conditions, it is possible to reach desulphurization rates above 99%, but the saturation rate of the olefins then becomes very high (above 55%, cf. hydrodesulphurated gasoline A4).

Example 2

Influence of the Collection Compositions

Gasoline A1 as described in example 1 is used to compare the performances of different collection compositions of sulphur. Before use, each of these three compositions is reduced under hydrogen in a tubular reactor containing 50 ml of said composition. Three collection compositions were assessed:

Composition β1 marketed by the company Axens under the reference LD341 is composed of a support based on alumina and below 20% by weight of nickel. After reduction, composition β1 contains below 21% by weight of reduced nickel.

This composition does not come within the scope of the invention as it contains below 25% of reduced nickel.

Composition β2, marketed by the company Axens under the reference AX746 contains between 25% and 30% by weight of nickel on a porous mineral support based on alumina. After reduction, composition β2 contains more than 25% by weight of reduced nickel.

Composition β3 marketed by the company Axens under the reference LD746 contains more than 50% by weight of nickel on a porous mineral support based on silica-alumina. After reduction, composition β3 contains more than 40% by weight of reduced nickel.

For each composition, the 50 ml sample in the tubular reactor is heated to 160° C. in the absence of hydrogen (an intermediate nitrogen sweep being performed to flush out the hydrogen used during the reduction). Gasoline A1 containing 55.6 ppm by weight of sulphur, including 31.2 ppm by weight sulphur in the form of mercaptans, is injected into the reactor at a flow rate of 150 ml/h and under a pressure of 2 MPa.

After 24 h, then 400 hours of operation, a recipe sample is recovered and analysed.

TABLE 2

| Collection composition | Operation time | Sulphur content | Mercaptans content | Sulphur collection rate |
|---|---|---|---|---|
| β1 (comparative) | 24 hours | 22.6 | 2.0 | 0.60 |
| | 400 hours | 52.3 | 30.3 | 0.06 |
| β2 (according to the invention) | 24 hours | 18.7 | 0.7 | 0.68 |
| | 400 hours | 27.7 | 6.2 | 0.51 |
| β3 (according to the invention) | 24 hours | 12.3 | 0.0 | 0.79 |
| | 400 hours | 19.9 | 1.9 | 0.66 |

The three compositions assessed allow at least 60% of the sulphur to be collected at the end of 24 hours; however, only compositions β2 and β3 according to the invention allow more than 50% of the sulphur to be collected after 400 hours of operation.

Example 3

Influence of the Collection Temperature

Gasoline A1 containing 55.6 ppm by weight of sulphur, including 31.2 ppm of mercaptans originating in example 1, is injected at a flow rate of 150 ml/h at a pressure of 2 Mpa into a tubular reactor filled with 50 ml of composition β3. The temperature is set at 35° C., 100° C. then 160° C. The same experiment is carried out starting from gasoline A2 containing 30 ppm by weight of sulphur, including 24.7 ppm by weight of mercaptans. At each temperature, a sample of product is taken and analysed. Table 3 shows the sulphur and mercaptans contents measured in this way.

TABLE 3

| Collection at 35° C. | A11 | A21 |
|---|---|---|
| Mercaptans, ppm by weight | 30.4 | 24.8 |
| Total sulphur, ppm by weight | 54.1 | 29.9 |
| Collection at 100° C. | A12 | A22 |
| Mercaptans, ppm by weight | 17.6 | 14.2 |
| Total sulphur, ppm by weight | 45.4 | 20.2 |
| Collection at 160° C. | A13 | A23 |
| Mercaptans, ppm by weight | 2.9 | 2.3 |
| Total sulphur, ppm by weight | 18.1 | 7.3 |

Gasolines A21, A22 and A23 originate in the treatment of the hydrosulphurated gasoline A2 over the composition β3.

Gasolines A21, A22 and A23 are originate in the treatment of the hydrosulphurated gasoline A2 over the composition β3.

It is clear in the light of this example that the use of the collection composition at 35° C. does not allow a large quantity of sulphur to be collected, compared with its use at 100° C. and 160° C. On the other hand, by operating the collection composition at 100° C. and even better at 160° C., it is possible to produce gasolines with a low sulphur content compared with those produced when operating the collection composition at 35° C. In the case where the temperature is 160° C., the composition collects almost all the mercaptans, and a large fraction of the other sulphurous compounds.

Comparisons of Examples 1 and 3

Gasolines A13 and A23 were analysed in detail in order to compare them with gasolines A3 and A4 from example 1. Table 4 summarizes the results of these analyses.

TABLE 4

| References | Gasolines originating in example 1 | | Gasolines originating in example 3 | |
|---|---|---|---|---|
| for the gasoline | A3 | A4 | A13 | A23 |
| Mercaptans, ppm by weight | 18.1 | 10.2 | 2.9 | 2.3 |
| Total sulphur, ppm by weight | 19.8 | 10.8 | 18.1 | 7.3 |
| Desulphurization rate, % compared with gasoline A | 98.8% | 99.3% | 98.9% | 99.6% |

TABLE 4-continued

| References for the gasoline | Gasolines originating in example 1 | | Gasolines originating in example 3 | |
|---|---|---|---|---|
| | A3 | A4 | A13 | A23 |
| Olefines saturation rate, % compared with gasoline A | 46.5% | 55.6% | 30.8% | 38.2% |
| Delta RON | 1.9 | 2.2 | 1.3 | 1.5 |
| Delta MON | 5.5 | 7.2 | 3.7 | 4.7 |

Gasolines A3 and A13 have similar total sulphur contents. On the other hand, gasoline A13 contains a much smaller mercaptans fraction, giving it a clearly less corrosive character. Moreover, the octane loss for gasoline A13 (RON or MON) is much less than the octane loss for gasoline A3. Gasoline A13, which has better octane numbers, is thus of better quality.

Similarly, gasolines A4 and A23 have similar total sulphur contents. On the other hand, gasoline A23 contains a smaller mercaptans fraction, thus a very small corrosive character. Moreover, the octane loss for gasoline A23 is much less than the octane loss for gasoline A4. Gasoline A23, which moreover has better octane numbers, is thus of a better quality.

This example shows how the use of a sequence comprising a hydrodesulphurization step and a complementary step of collecting sulphurous compounds over an adsorbent according to the invention and in operating conditions according to the invention, allows the quality of the gasoline to be significantly improved, compared with a treatment by a hydrodesulphurization process alone. Moreover, due to the use of the collection step, the operating temperature of the hydrodesulphurization step is significantly reduced, which allows an improvement in the life of the catalyst of the hydrodesulphurization step, and in energy consumption.

The preceding examples can be repeated with similar success by substituting the generically or specifically described reactants and/or operating conditions of this invention for those used in the preceding examples.

The entire disclosures of all applications, patents and publications, cited herein and of corresponding French application No. 06/10.111, filed Nov. 16, 2006, are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

In the foregoing and in the examples, all temperatures are set forth uncorrected in degrees Celsius and, all parts and percentages are by weight, unless otherwise indicated.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The invention claimed is:

1. A process of treating a sulphur-containing hydrocarbon fraction containing monoolefins and thiophenes, comprising the following steps:
a) a hydrodesulphurization step of said hydrocarbon fraction to produce a partially sulphur-depleted effluent, comprising passing said hydrocarbon fraction mixed with excess hydrogen over at least one hydrodesulphurization catalyst producing as a byproduct recombinant mercaptans,
b) a step of separation of the partially desulphurized hydrocarbon fraction from the excess hydrogen, as well as $H_2S$ formed in step a),
c) a step of collecting in a single step resultant residual thiophene compounds and recombinant mercaptans, comprising placing the partially desulphurized hydrocarbon fraction originating in step b) in contact with an adsorbent comprising nickel in reduced form, in the absence of hydrogen and at a temperature between 140° C. and 240° C., the nickel content in the reduced form being above 40% by weight of the adsorbent, said adsorbent being the same for the adsorption of both the residual thiophenes and the recombinant mercaptans.

2. A process according to claim 1 in which the nickel-containing adsorbent is supported by a support based on a metal oxide or a binder based on a metal oxide, the metal oxide being chosen from the following families: silicas, aluminas, silica-aluminas, as well as zeolites.

3. A process according to claim 1, wherein the hydrocarbon fraction is a gasoline and in which the hydrodesulphurization step a) comprises placing the gasoline to be treated in contact with hydrogen, in one or more hydrodesulphurization reactors in sequence, containing one or more catalysts suitable for carrying out the hydrodesulphurization.

4. A process according to claim 3 in which the hydrodesulphurization step in the reactor or reactors is conducted at a pressure of between 0.5 MPa and 5 MPa and a temperature between 200° C. and 400° C.

5. A process according to claim 4, wherein the hydrodesulphurization is conducted under such conditions that less than 60% of the monoolefins are hydrogenated.

6. A process according to claim 3, wherein the hydrodesulphurization step a) is carried out in several reactors in sequence, and the average operating temperature of each reactor of the hydrodesulphurization step is greater by a least 5° C. than the operating temperature of the preceding reactor.

7. A process according to claim 3 in which the catalyst or catalysts used in the hydrodesulphurization step comprise an amorphous and porous mineral support chosen from aluminas, silicon carbide, silica, silica-aluminas, titanium oxide, and magnesium oxide, the last two oxides being used alone or mixed with alumina or silica-alumina, the support having a specific surface area of less than 200 m²/g, the catalyst before sulphurization having an average pore diameter greater than 20 nm, the catalyst containing at least one metal of group VIB and/or at least one metal of group VIII on said support, the metal from group VIB having a surface density of between $2\times10^{-4}$ and $4.0\times10^{-3}$ grams of oxide of said metal per m² of support.

8. A process according to claim 1, comprising in step b) cooling effluent from step a), to a temperature below 80° C. in order to condense the hydrocarbons, separating resultant gas and liquid phases, passing the liquid phase containing the desulphurized gasoline as well as a fraction of the dissolved $H_2S$ to a stripping section, and passing the gaseous phase constituting principally hydrogen and which contains the majority of the $H_2S$ to a purification section.

9. A process according to claim 8 in which the stripping comprises heating the gasoline in a distillation column which allows the light compounds which cannot be condensed, including the residual traces of $H_2S$, to be recovered overhead.

10. A process according to claim 1 in which, before step c), the partially desulphurized gasoline originating in step b) is mixed with another gasoline containing sulphur.

11. A process according to claim 1 in which, before step a), the sulfur-containing hydrocarbon fraction is distilled into two fractions, a light fraction and a heavy fraction, and only the heavy fraction is treated by the hydrodesulphurization step a), the light and heavy fractions are remixed before or after the $H_2S$ separation step b), and the light and heavy fractions are treated jointly in the collection step c).

12. A process according to claim 1 in which the hydrocarbon fraction is treated before step a) in a first step comprising converting the mercaptan-type light saturated sulphurous compounds into heavier sulphurous compounds.

13. A process according to claim 12 in which the hydrocarbon fraction is distilled into three cuts, a light cut, an intermediate cut and a heavy cut, each of the intermediate and heavy cuts being treated separately in a hydrodesulphurization step, step a), then a separation step, step b), and conducting the step of collecting the sulphurous compounds, step c), on the effluents of individual step b) or a mixture of said effluents.

14. A process according to claim 1, wherein the hydrodesulfurization (HDS) catalyst comprises a support and mixture of group VIII and VIB metals.

15. A process according to claim 14, wherein the HDS catalyst comprises as the mixture of metals, cobalt and molybdenum.

16. A process according to claim 1, wherein at least a portion of the recombinant mercaptans and thiophenes are collected simultaneously.

17. A process according to claim 16, wherein the step of collecting c) is conducted at a temperature of about 160° C.

18. A process according to claim 1, wherein the step of collecting c) is conducted at a temperature of about 160° C.

19. A process according to claim 1, wherein said adsorbent comprises a support of alumina having a BET surface greater than 150 m²/g.

20. A process according to claim 1, wherein the desulphurization rate of the product from step c) is at least about 99% and the monoolefin saturation rate is less than about 40%.

21. A process according to claim 1, wherein after step c), there are no further measures to remove thiophenes compounds.

22. A process of removing sulphurous contaminants from a hydrocarbon fraction containing monoolefins and thiophenes, said process consisting of the following steps for removing the sulfur contaminants:
    a) a hydrodesulphurization step of said hydrocarbon fraction to produce a partially sulphur-depleted effluent, comprising passing said hydrocarbon fraction mixed with excess hydrogen over at least one hydrodesulphurization catalyst producing as a byproduct recombinant mercaptans,
    b) a step of separation of the partially desulphurized hydrocarbon fraction from the excess hydrogen, as well as $H_2S$ formed in step a),
    c) a step of collecting in a single step resultant residual thiophene compounds and recombinant mercaptans, comprising placing the partially desulphurized hydrocarbon fraction originating in step b) in contact with an adsorbent comprising nickel in reduced form, in the absence of hydrogen and at a temperature between 140° C. and 240° C., the nickel content in the reduced form being above 40% by weight of the adsorbent, said adsorbent being the same for the adsorption of both the residual thiophenes and the recombinant mercaptans.

23. A process of treating a sulphur-containing hydrocarbon fraction containing monoolefins and thiophenes, comprising the following steps:
    a) a selective hydrodesulphurization step of said hydrocarbon fraction to produce a partially sulphur-depleted effluent, comprising passing said hydrocarbon fraction mixed with excess hydrogen over at least one hydrodesulphurization catalyst producing as a byproduct recombinant mercaptans,
    b) a step of separation of the partially desulphurized hydrocarbon fraction from the excess hydrogen, as well as $H_2S$ formed in step a),
    c) a step of collecting in a single step resultant residual thiophene compounds and recombinant mercaptans, comprising placing the partially desulphurized hydrocarbon fraction originating in step b) in contact with an adsorbent comprising nickel in reduced form, in the absence of hydrogen and at a temperature between 140° C. and 240° C., the nickel content in the reduced form being above 40% by weight of the adsorbent, said adsorbent being the same for the adsorption of both the residual thiophenes and the recombinant mercaptans.

24. A process according to claim 23, wherein step a) is a single selective hydrodesulphurization step.

* * * * *